INVENTORS:
KEITH R. WILLIAMS
JOHN G. SMITH

United States Patent Office 3,464,861
Patented Sept. 2, 1969

3,464,861
FUEL CELLS WITH SOLID STATE
ELECTROLYTES
Keith R. Williams, Little Sutton, Wirral, and John G. Smith, Ellesmere Port, Wirral, England, assignors to Shell Oil Company, New York, N.Y., a corporation of Delaware
Filed Aug. 20, 1964, Ser. No. 390,807
Int. Cl. H01m 27/10
U.S. Cl. 136—86                 8 Claims

ABSTRACT OF THE DISCLOSURE

A fuel cell comprising a porous metal substrate separated from a metal-coated calcium oxide or yttria-stabilized zirconia electrolyte by a layer of nickel aluminide.

Figure 1:
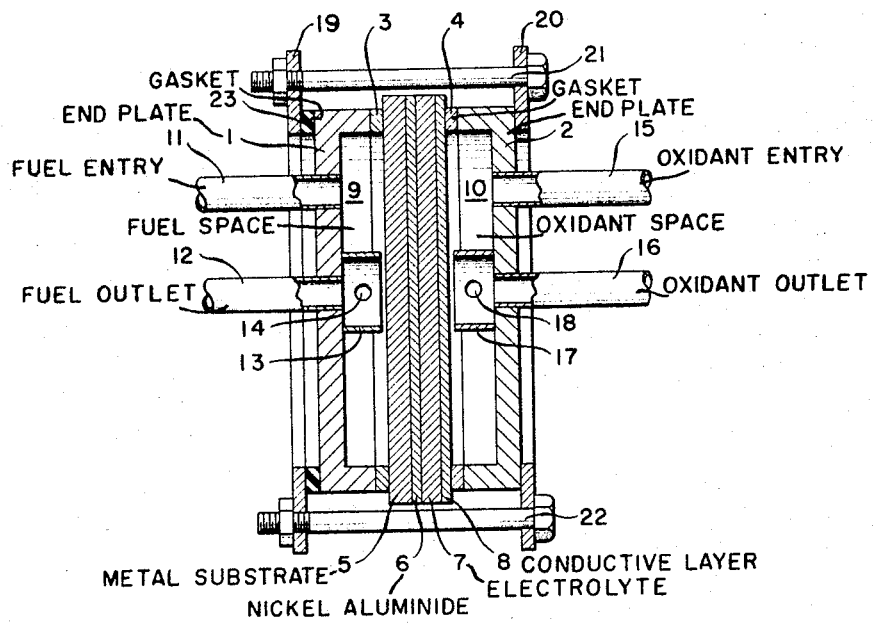

This invention relates to fuel cells and is particularly concerned with high temperature fuel cells which comprise solid state oxide electrolytes wherein conduction of electricity through the electrolyte is via transport of anion only. That is to say electrons are transferred from the oxidant electrode by oxygen ions to the fuel electrode, discharged thereat and returned to the oxidant electrode via an external circuit.

In certain solid state oxides oxygen appears to migrate through the crystal lattice via oxygen ion vacancies in said lattice, i.e., such materials conduct electricity by anion transport only. An example is the mixed oxide of zirconia and lime which crystallizes in an imperfect fluorite type of lattice, has the atomic ratios of $Zr_{0.85}Ca_{0.15}O_{1.85}$ and is believed to maintain the fluorite type of lattice because it contains oxygen ion vacancies generated by the replacement of zirconium atoms by calcium atoms in the ratio indicated above. These vacancies in the crystal lattice, which promote transfer of the anion $O^{--}$ through the lattice, arise because, for valency reasons, each calcium atom combines with only one oxygen atom instead of the two held by zirconium. Other combinations of oxides which give crystal lattices having therein oxygen ion vacancies are known; for example, oxygen ion vacancies can be generated in the crystal lattice of the oxides of hafnium and thorium by oxides of such elements as calcium, lanthanum, and yttrium.

Particular advantages offered by a solid-state electrolyte are that a fuel cell comprising such electrolyte can successfully utilize, inter alia, gaseous hydrocarbon fuels and is free of the many known disadvantages inherent in the liquid electrolyte or molten electrolyte type of fuel cell. Thus, the electrolyte is not diluted by water formed as a result of the electrode reaction, and the electrode flooding which so frequently occurs with ordinary liquid electrolytes unless expensive electrodes of special construction are used is eliminated. Also, the solid-state electrolyte cell is relatively insensitive to gas pressure variations which would cause gas accumulation in the electrolyte of an ordinary liquid electrolyte fuel cell. The solid electrolyte can serve as a more effective gas barrier than is possible with liquid electrolytes, especially the commonly used molten electrolytes in sintered magnesia or similar matrices where it is difficult to impregnate all the pores of the matrices so that cross leakage of gases takes place with resulting inefficiency of cell operation.

However, the development of fuel cells utilizing as electrolytes solid-state oxides wherein electrical conduction is by anion transport only has hitherto been impeded by the difficulty of constructing and supporting layers of the solid state electrolyte which are sufficiently thin. Very thin layers are essential in order to achieve current densities of practical value at temperatures which are convenient to induce and maintain and which do not promote oxidative attack on the fuel cell components.

It has now been found that thin, solid-state oxide electrolyte films can be made by applying a thin, porous layer of a nickel-aluminum intermetallic compound or mixture, hereinafter referred to for convenience as nickel aluminide, to a porous metal substrate and then coating the nickel aluminide layer with the solid-state electrolyte. In this way, not only is a very strong electrolyte-substrate bond obtained but also the catalytic activity at the substrate-electrolyte junction is improved. The catalytic activity can be further enhanced by adding to the layer of nickel aluminide a thin layer of a platinum group metal. It has also been found that if the free face of an electrolyte layer deposited on a porous metal substrate is subsequently coated with a thin conductive layer there is produced a fuel cell unit wherein the porous metal substrate forms the fuel electrode, the thin conductive layer forms the oxidant electrode and the solid-state oxide forms the electrolyte and wherein said electrodes are intimately bonded to said electrolyte.

Accordingly, the present invention, in one of its aspects, is directed to a fuel cell unit comprising a porous metal substrate having applied to one surface thereof a porous layer of nickel aluminide followed by a layer of solid oxide electrolyte and then by an oxygen permeable layer of conductive material. A porous layer of a platinum group metal may with advantage be applied to the layer of nickel aluminide.

Another special aspect of the present invention comprises a method of ocnstructing a fuel cell unit comprising flame spraying a layer of nickel aluminide onto a porous metal substrate, plasma spraying a layer of solid-oxide electrolyte onto said layer of nickel aluminide and thereafter coating said oxide layer with a layer of conductive material.

It will be appreciated that fuel cell units according to the present invention can be connected together by various means to form a battery and accordingly the present invention includes as a further aspect a fuel cell comprising a plurality of fuel cell units as hereinbefore described.

The porous metal substrate may take the form of a disc or sheet of metal having catalytic properties with respect to the fuel to be used and being so fabricated as to have an average pore diameter within the range 0.1 to 500 microns and preferably within the range 1 to 100 microns. In this specification the term "average pore diameter" refers to a specific property of the substrate, which can be ascertained by measuring the pressure necessary to force air, applied over the surface of the porous substrate, through the pores when the substrate is thoroughly wetted by a suitable liquid. The average pore diameter $d$ is then defined by the equation $$d=\frac{4T}{p}$$

where $p$ is the pressure in dynes/cm.$^2$ and T is the surface tension of the liquid in dynes/cm. Nickel-containing substrates are especially advantageous. Stainless steel and nickel are examples of suitable materials which can be used. The thickness of the porous metal substrate may be in the range 0.001″ to 0.1″; a thickness within the range 0.01″ to 0.05″ is preferred but the thickness chosen will depend essentially upon the size of the fuel cell unit to be constructed. Nickel aluminide applied preferably contains a preponderance of nickel to aluminium and advantageously is composed of about 1 to about 3 atomic weights of nickel per atomic weight of aluminium. The porous film of nickel aluminide is best applied by the flame spraying process known under the trade name "Metco 404 Process," wherein a powder composed of about 20% by weight of aluminium and 80% by weight of nickel gives after spraying a mixture of nickel aluminides having the formula range NiAl to $Ni_3Al$, but other methods of applying alloyed metal by melting in a flame and forming a coating by spraying such as are described in the "Metco Metallizing Handbook" of Ingham and Shepard, volumes I and II, for instance, can also be used. Film thicknesses in the range 0.0005 to 0.05″ are desirable but it is preferred to establish films having thicknesses within the range 0.002″ to 0.02″. As hereinbefore mentioned, the nickel aluminide film in addition to strengthening the bond between the solid-state electrolyte and the porous metal substrate enhances the catalytic activity of said substrate with respect to the fuel to be used. This catalytic activity may be further enhanced by treatment of the flame sprayed coating of nickel aluminide with an aqueous solution of base before the solid electrolyte is applied.

Advantageously an aqueous solution of alkali such as sodium, potassium, or lithium hydroxide, e.g., 6NKOH, or the like is used for this treatment. But most preferably the catalytic activity is enhanced by applying to the free surface of the nickel aluminide a thin layer of a platinum group metal. Platinum advantageously applied as a platinum paint of the kind marketed under the trade name "Johnson & Matther Bright Platinum G" is especially suitable but osmium, iridium, palladium, or the like, can also be used.

The solid-state oxide must be an oxide which conducts electricity by an anion transfer process and which does not become unduly electronically conductive (or semiconductive) in a normal sense at elevated temperatures. Subject thereto, oxides which crystallize in the fluorite type of lattice are generally suitable. For example, oxides of zirconium, hafnium, and thorium and mixtures thereof, mixed with oxides of other metals of lower valency, for example, calcium and certain rare earths, e.g., lanthanum, yttrium, and scandium, chosen and supplied in such proportions as to maintain a fluorite type of crystal lattice are suitable. Particularly suitable are oxides of zirconium, stabilized with lime or yttria, especially oxides of zirconium stabilized with amounts of lime in the range 10–15 mole percent, or yttria in the range 5–12 mole percent, e.g., oxides having the atomic ratios $Zr_{0.9}Ca_{0.1}O_{1.9}$ or $Zr_{0.82}Y_{0.16}O_{2.08}$. The oxide layer can be applied to the nickel aluminide layer advantageously by means of the plasma spray process, i.e., a process in which a mixture such as zirconium oxide with lime or yttria particles is passed through an arc struck in a current of nitrogen and hydrogen, the gas temperature of which is raised to a value exceeding the melting point of zirconia, so that molten oxide particles are projected against the receiving surface. Oxide film thicknesses within the range 0.0001 to 0.1″ are useful; film thicknesses within the range 0.0005 to 0.05″ are desirable while film thicknesses within the range 0.001 to 0.01″ are especially preferred.

The conductive layer applied to the electrolyte film may comprise metals from Group I–B of the Periodic Table such as copper or gold or metals of the platinum group such as platinum, palladium, etc., or mixtures thereof but silver is preferred on grounds of catalytic activity, conductivity, ease of application and cheapness. In general, the conductive film should be porous in nature and may be applied to the electrolyte film by flame spraying, chemical reduction methods or vacuum evaporation and if desired may be thickened by electrodeposition. If the conductive layer is to be applied by flame spraying, it is desirable to incorporate an inorganic support for the metal, i.e., to spray the metal admixed with, for example, oxides of such metals as zirconium, zinc, or aluminum. If silver or alloys comprising substantial amounts of silver are used, then a porous film is not essential because oxygen can pass through the silver layer by solution. Suitable thicknesses for the conductive layer are thicknesses within the range 0.03 micron, 50 microns if the film is substantially continuous, while greater thicknesses, e.g., up to 200 microns are useful if the film is porous.

Fuel cell units of the present invention are capable of operating on a wide range of fuels, for example hydrogen, carbon monoxide, water gas, producer gas, hydrocarbon gases, e.g., methane, ethane, and propane, and mixtures thereof, and such materials as methyl alcohol and ethyl alcohol when supplied in vapor form. It is advantageous when utilizing hydrocarbon fuels to supply the hydrocarbon admixed with steam; one way of doing this is to supply the hydrocarbon fuel admixed with the exhaust gas obtained from the fuel electrode side of the cell.

Since a fuel cell unit as herein described is a simple, thin compact but relatively robust structure, it can conveniently be mounted between end plates, e.g., stainless steel end plates, so as to ennclose gas spaces, thereby forming a fuel cell comprising a single fuel cell unit. Alternatively a battery may be formed by mounting a plurality of fuel cell units between electrically insulating, gas impervious spacers so that electrodes of like polarity enclose alternatively oxidant and fuel gas or fuel gas and oxidant spaces, such assembly being mounted between end plates. A further arrangement is to mount a plurality of fuel cell units according to the present invention such that electrodes of unlike polarity face each other and to provide gas impervious partitions to divide the gas space so formed between the units into oxidant and fuel gas spaces, the fuel cell units being separated from the partitions by means of suitable gas impervious spacers.

When starting a fuel cell unit according to the present invention, it is first necessary to heat the electrolyte. It is an advantage of the invention that the new fuel cells can be operated successfully at lower temperatures than have heretofore been necessary with solid-state oxide electrolytes. Temperatures in the general range of about 700° to 800° C. ar especially advantageous but higher or lower temperatures can be employed. The initial heating may be effected in a variety of ways, e.g., by the provision of electrical heaters integral with each unit or with the battery as a whole or by supplying hot gases to the fuel cell assembly or by supplying heat in any other convenient manner. However, when a battery of such fuel cell units is supplying current at high output, it will generally be that the electrochemical reactions responsible for the generation of electricity will supply the heat necessary for maintaining the temperature at a suitable level and the external heat supply may be discontinued.

Figure 2:
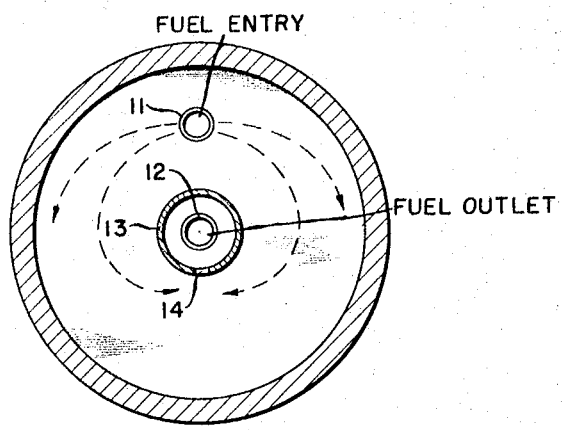

An embodiment of the present invention will now be described with reference to the accompanying drawings wherein FIGURE 1 is a vertical central section of a fuel cell on a plan at right angles to the face of the porous metal substrate, and FIGURE 2 is a plan view of the inner face of an end plate of the fuel cell.

Referring to FIGURE 1, a fuel cell has end plates 1 and 2, between which and separated therefrom by silver gaskets 3 and 4 is a fuel cell unit consisting of a porous metal substrate 5, a layer of nickel aluminide 6, a solid oxide electrolyte 7 and a layer of conductive material 8. The end plate 1, gasket 3, and porous metal substrate 5 enclose a fuel space 9. The end plate 2, gasket 4, and conductive layer 8 enclose an oxidant space 10. The end plate 1 is provided with a fuel entry conduit 11 and a fuel exit conduit 12. An annular projection 13 mounted on the fuel space side of end plate 1 and formed with an aperture 14 gives access to the fuel exit conduit 12. The end plate 2 is provided with an oxidant entry conduit 15 and an oxidant exit conduit 16; an annular projection 17 mounted on the oxidant space side of the end plate 2 and formed with an aperture 18 gives access to the oxidant exit conduit 16. The fuel cell is held together by brackets 19 and 20 through which pass retaining bolts 21 and 22 and the end plate 1 is electrically insulated from the bracket 19 by an insulating gasket 23. Electrical continuity between the fuel cell and apparatus absorbing the electrical output developed when the fuel cell is in operation is maintained by leads (not shown) suitably attached to the end plates 1 and 2.

In operation, the fuel cell is first brought to operating temperature by preheating in an electric furnace. Fuel is then supplied to the fuel space 9 via the fuel entry conduit 11 and unreacted fuel is withdrawn from the fuel space 9 via the exit conduit 12 after having circulated over the surface of the fuel electrode in the manner indicated by the broken arrows in the drawing of FIGURE 2. Oxidant is supplied to the oxidant space 10 via the oxidant entry conduit 15 and unreacted oxidant withdrawn via the exit conduit 16, circulation of oxidant over the surface of the oxidant electrode being effected in a manner similar to that described for the fuel electrode.

While, for simplicity and clarity, the assembly described above comprises only a single fuel cell unit 5, 6, 7, 8, a plurality of such units may, as already mentioned be combined in series and/or parallel to form a battery.

The present invention will now be further illustrated with reference to the accompanying examples of single fuel cell units made in accordance with the present invention. All of the examples relate to a porous metal substrate in the form of a disc having a diameter of 2 inches. To one face of the disc there was applied by the flame spraying process known as "Metco 404" a porous layer of nickel aluminide followed by a layer of solid-state oxide, said oxide being applied by means of an electric plasma powder spray gun using an 80 volt/500 ampere arc in a mixture of nitrogen and hydrogen gases. A layer of silver of thickness 0.5 micron was then applied to the free face of the solid-state oxide layer by vacuum evaporation, care being taken to ensure that no silver was deposited on the edge of the oxide layer. In the fuel cell units of Examples IV, VI, X, XII, and XIII, a bright platinum paint of the kind known as Johnson Matthey Bright Platinum G was applied to the layer of nickel aluminide immediately before application of the solid-state oxide. The resulting fuel cell unit was then assembled between stainless steel end plates in the manner described above with reference to the accompanying drawings.

Comparison of Examples III with IV, V with VI, IX with X and XI with XII shows that an increase in output is obtained when, in accordance with the present invention, a porous layer of platinum is applied to the layer of nickel aluminide. From Examples III and VIII and VII and IX, it is seen that an increase in output is obtained when zirconia stabilized with yttria is used in place of zirconia stabilized with lime as the solid electrolyte. The examples also show that substantially higher outputs are obtained when stainless steel is used in place of nickel as the porous metal substrate.

While cells containing zirconia together with other oxides as the solid-state electrolyte have been emphasized in the foregoing examples because of the outstanding advantages which these electrolytes provide when applied in accordance with the invention, it will be understood that the invention is not limited to these electrolytes but is applicable to all cells having solid-state oxide electrolytes which conduct electricity by anion transport only under the operating conditions employed.

| Ex. No. | Porous Metal Substrate | | Solid State Electrolyte | | Thickness of Nickel Aluminide (in.) | Platinum Layer (0.5 Microns Thick) | Fuel | Operating Temp. (°C.) | Voltage | Output (milli-amps/sq. cm.) |
|---|---|---|---|---|---|---|---|---|---|---|
| | Nature | Thickness (in.) | Nature | Approx. Pore Size (Microns) | | | | | | |
| I | Roll compacted sintered nickel | 0.025 | Zirconia stabilized with 6.4 percent wt. CaO (i.e. 13 mole percent CaO). | 5 | 0.007 | 0.0025 | No | Hydrogen | 710/800 | 0.4/0.4 | 21/50 |
| II | do | 0.040 | As for Ex. I | 5 | 0.008 | 0.010–0.015 | No | do | 750 | 0.5 | 25 |
| III | Perforated nickel | 0.026 | As for Ex. I | 50 | 0.008 | 0.010–0.015 | No | do | 750 | 0.5 | 18 |
| IV | do | 0.026 | As for Ex. I | 50 | 0.008 | 0.010–0.015 | Yes | do | 750 | 0.5 | 27 |
| V | Sintered nickel on perforated nickel base | 0.031 | As for Ex. I | 50 | 0.008 | 0.010–0.015 | No | do | 750 | 0.5 | 22 |
| VI | do | 0.031 | As for Ex. I | 50 | 0.008 | 0.010–0.015 | Yes | do | 750 | 0.5 | 30 |
| VII | Sintered stainless steel | 0.067 | As for Ex. I | 25 | 0.008 | 0.010–0.015 | No | do | 750 | 0.5 | 43 |
| VIII | Perforated nickel | 0.026 | Zirconia stabilized with 14 percent wt. Y₂O₃ (i.e. 8 mole percent Y₂O₃). | 50 | 0.008 | 0.010–0.015 | No | do | 750 | 0.5 | 34 |
| IX | Sintered stainless steel | 0.067 | As for Ex. VIII | 25 | 0.008 | 0.010–0.015 | No | do | 750 | 0.5 | 170 |
| X | do | 0.067 | As for Ex. VIII | 25 | 0.008 | 0.010–0.015 | Yes | do | 750 | 0.5 | 195 |
| XI | Stainless steel gauze | 0.035 | As for Ex. VIII | 50–75 | 0.008 | 0.010–0.015 | No | do | 750 | 0.5 | 170 |
| XII | do | 0.035 | As for Ex. VIII | 50–75 | 0.008 | 0.010–0.015 | Yes | do | 750 | 0.5 | 180 |
| XIII | do | 0.056 | As for Ex. VIII | 50–75 | 0.006 | 0.010–0.015 | Yes | do | 750/800 | 0.5/0.6 | 230/300 |
| XIV | do | 0.056 | As for Ex. VI | 50–75 | 0.006 | 0.010–0.015 | No | do | 750 | 0.5 | 120 |
| XV | do | 0.035 | As for Ex. VIII | 50–75 | 0.008 | 0.010–0.015 | No | 2:1-vol./vol.- methanol vapor/steam | 750 | 0.5 | 120 |
| XVI | do | 0.035 | As for Ex. VIII | 50–75 | 0.008 | 0.010–0.015 | No | 3:1-vol./vol.- methanol vapor/steam | 750 | 0.5 | 80 |
| | | | | | | | | Kerosene vapor | | | |

In Examples I–XVI the nickel aluminide layer consisted of a mixture of aluminides having the formula range Ni₃Al to NiAl.

In Examples VII and IX–XVI, the stainless steel used was of the kind known as 18/8 type stainless steel, i.e. steel containing about 18% Cr and 8% Ni by weight, but other types of stainless steel, e.g. 25/20 may be used if desired.

We claim as our invention:

1. A fuel cell unit comprising:
   (a) a porous metal substrate, consisting essentially of stainless steel or nickel, having on one surface thereof a porous coating of nickel aluminide wherein the atomic ratio of nickel to aluminum has a value of from 1 to 3; and
   (b) a layer of solid oxide electrolyte which conducts electricity substantially solely by anion transfer, consisting essentially of zirconia stabilized with calcium oxide or yttria, having one surface of said electrolyte layer in adherent contact with said nickel aluminide coating and the opposite surface thereof in adherent contact with an oxygen-permeable conductive layer consisting essentially of a metal of Group I–B of the Periodic Table or a platinum group metal.

2. A fuel cell unit in accordance with claim 1 wherein the oxygen permeable conductive layer is a continuous layer of silver.

3. A fuel cell unit in accordance with claim 1 wherein the electrolyte consists essentially of zirconia with 10 to 15 mole percent lime.

4. A fuel cell unit in accordance with claim 1 wherein the electrolyte consists essentially of zirconia with 5 to 12 mole percent yttria.

5. A fuel cell unit in accordance with claim 1 having a porous layer of a platinum group metal between and in contact with said nickel aluminide layer and the solid oxide electrolyte.

6. A fuel cell unit in accordance with claim 5 wherein the nickel aluminide layer is 0.0005 to 0.05 inch thick.

7. A fuel cell unit comprising a porous metallic electrode of about 0.001 to 0.1 inch thickness consisting essentially of stainless steel or nickel having on one surface thereof a layer of nickel aluminide 0.002 to 0.02 inch thick wherein the atomic ratio of nickel to aluminum is from 1 to 3, an oxygen permeable silver electrode having a thickness of 0.3 to about 200 microns and between said silver electrode and nickel aluminide layer a solid oxide electrolyte which conducts electricity substantially solely by anion transfer having a thickness of 0.0001 to 0.1 inch and consists essentially of zirconia stabilized with 5 to 12 mole percent yttria.

8. A fuel cell unit in accordance with claim 7 wherein said first metallic electrode is a nickel electrode having pores with an average diameter of 0.1 to 500 microns.

References Cited

UNITED STATES PATENTS

| | | | |
|---|---|---|---|
| 3,219,730 | 11/1965 | Bliton | 136—86 |
| 3,276,910 | 10/1966 | Grasselli et al. | 136—86 |
| 3,281,273 | 10/1966 | Oser | 136—86 |
| 3,291,642 | 12/1966 | Jung | 136—86 |
| 3,296,030 | 1/1967 | Tragert | 136—86 |

WINSTON A. DOUGLAS, Primary Examiner

H. FEELEY, Assistant Examiner

U.S. Cl. X.R.

136—120, 153